United States Patent
Yoneyama (10) Patent No.: US 7,126,988 B2
(45) Date of Patent: Oct. 24, 2006

(54) METHOD FOR CODING IMAGE SIGNALS AND APPARATUS THEREOF USING AN AVERAGE TARGET CODING RATE

(75) Inventor: Akira Yoneyama, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 479 days.

(21) Appl. No.: 09/985,278

(22) Filed: Nov. 2, 2001

(65) Prior Publication Data

US 2002/0054636 A1  May 9, 2002

(30) Foreign Application Priority Data

Nov. 6, 2000  (JP)  ............ P2000-337046

(51) Int. Cl.
*H04N 7/12*  (2006.01)
(52) U.S. Cl. .................... 375/240.01
(58) Field of Classification Search ........ 375/240.01, 375/240.02, 240.26; *H04N 7/12*
See application file for complete search history.

(56) References Cited

U.S. PATENT DOCUMENTS

| 5,640,208 A | 6/1997 | Fujinami |
| 5,790,745 A | 8/1998 | Sugiyama et al. |
| 5,812,790 A | 9/1998 | Randall |
| 6,028,633 A | 2/2000 | Saunders et al. |

FOREIGN PATENT DOCUMENTS

| EP | 0 645 930 A1 | 3/1995 |
| JP | 5-183872 A | 7/1993 |
| JP | 8-265747 A | 10/1996 |
| JP | 09-214962 | 8/1997 |

OTHER PUBLICATIONS

Yokoyama Y. et al., "A Scene-Adaptive One-Pass Variable Bit Rate Video Coding Method For Storage Media", Image Processing, 1999. ICIP 99. Proceedings. 1999 International Conference on Kobe, Japan Oct. 24-28, 1999, Piscataway, NJ, USA, IEEE, US, Oct. 24, 1999, pp. 827-831, XP010368744.

*Primary Examiner*—Young Lee
(74) *Attorney, Agent, or Firm*—McDermott Will & Emery LLP (57) ABSTRACT

In analyzing a coded result to thereby calculate data distribution corresponding to a characteristic of an input image signal, rather than determining data distribution for all of the pictures, an aggregate of such pictures that have roughly the same coding difficulty is captured as one scene. This scene is prescribed as a video edit unit (VEU), so that, in configuration, the input image signal is subdivided into a plurality of video edit units (VEUs) to thereby set an average target coding rate for each of these video edit units (VEUs), which are entered as coding conditions to thereby determine data distribution for each of the pictures at the time of re-coding.

5 Claims, 5 Drawing Sheets

METHOD FOR CODING IMAGE SIGNALS AND APPARATUS THEREOF USING AN AVERAGE TARGET CODING RATE

BACKGROUND OF THE INVENTION

1. Field of the Invention

The invention relates to a coding method for high-efficiently coding an image signal and an image signal coding apparatus for realizing the method.

2. Description of the Related Art

The industries over the world have conventionally been discussing how to high-efficiently code an image signal. The high-efficiently coding methods have been standardized by the Moving Picture Experts Group (MPEG), which is one section of the joint technology committee of the ISO (International Organization for Standardization) and the IEC (International Electro-technical Commission). This standardization brought about such known results as ISO/IEC 13818-2 "Coding of Audio, Picture, Multimedia, and Hypermedia Information" (MPEG-2 Standard) and ISO/IEC DIS 11172 "Coding of Moving Pictures and Associated Audio ISO/IEC JTC1/SC29 WG11" (MPEG-1 Standard).

To improve the picture quality of an image signal which is high-efficiently coded on the basis of these standards, there is available a method for once coding an image signal under predetermined coding conditions and then re-coding it corresponding to its characteristic. A technology related to this method is disclosed in Japanese Unexamined Patent Publication No. Hei 9-214962 (1997) gazette.

Figure 5:
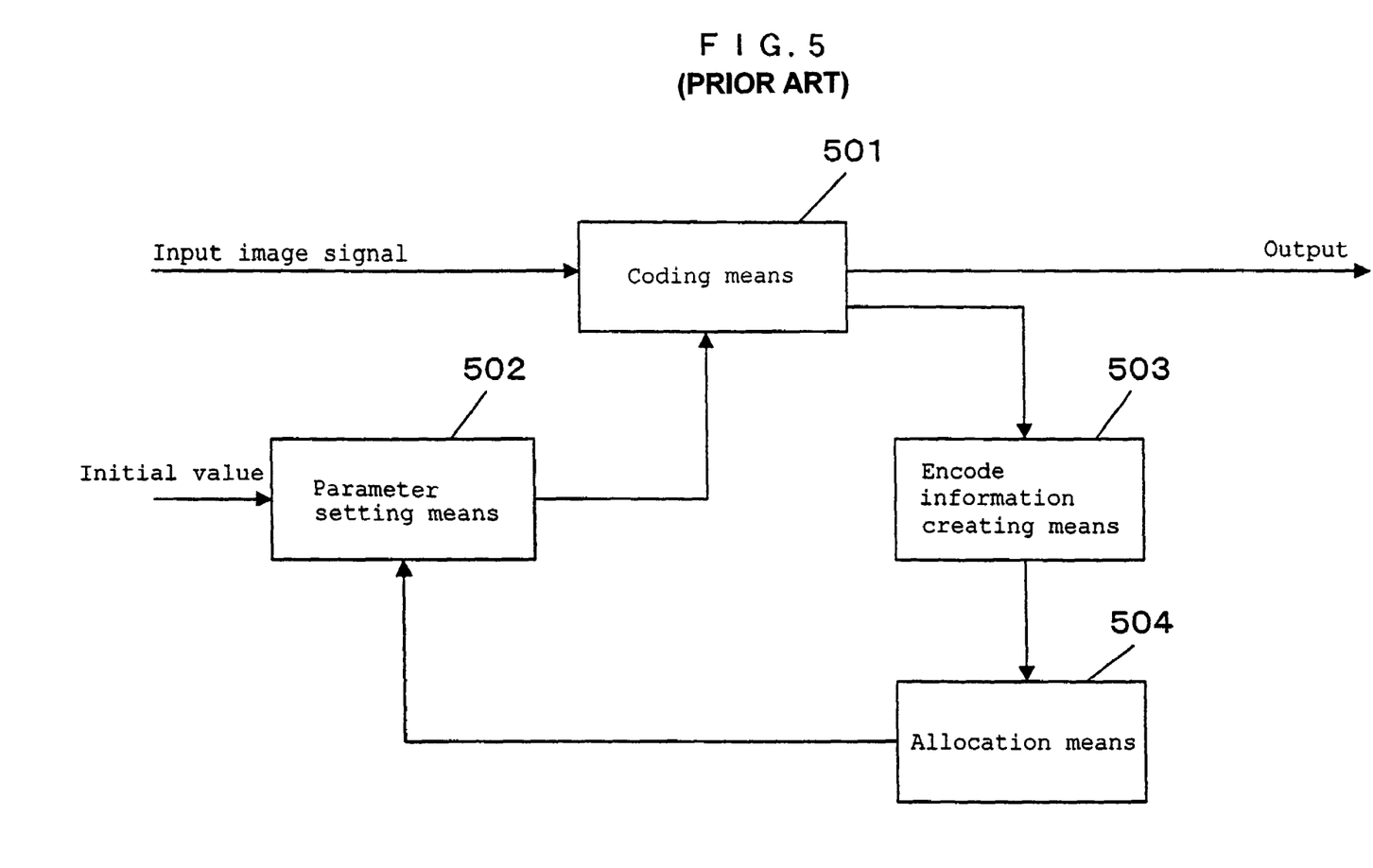
FIG. 5 is a block diagram for showing the image signal coding apparatus according to a background art.

The following will describe a conventional image signal coding method with reference to FIG. 5. A coding means 501 codes an image signal. A parameter setting means 502 sets coding conditions. An encode information creating means 503 extracts a characteristic from an input image signal based on a coded result. An allocation means 504 calculates optimal coding conditions based on the information of a characteristic extracted from the image signal.

The operations are as follows. An input image signal is coded by the coding means 501 according to a predetermined initial parameter set by the parameter setting means 502. The result obtained by coding and the conditions on coding are sent to the encode information creating means 503 to be analyzed there. The encode information creating means 503 determines coding difficulty of each picture constituting the input image signal by referencing such information as code amount generated on coding, quantization steps used for coding, magnitude of a motion vector, an activity, execution or non-execution of scene change and the like.

The analysis result obtained by the encode information creating means 503 is sent to the allocation means 504. The allocation means 504 calculates data distribution to each of the pictures based on respective coding difficulty of each of the pictures created by the encode information creating means 503. According to the data distribution calculated by the allocation means 504, the parameter setting means 502 changes the coding conditions, so that the coding means 501 re-codes the input image signal based on thus changed new coding conditions.

By the operation above, the input image signal can be coded corresponding to its characteristic. The coded picture quality can be improved as well. In case that a satisfactory coded picture quality cannot be obtained by executing coding only once, the processing steps mentioned above are repeated any number of times in a loop. Each time the processing is thus repeated, the picture quality is improved further. In this case, rather than repeating all the steps of the processing, only the calculation part by the allocation means 504 may be repeated any number of times in the loop, thus optimizing data distribution.

The method for image signal coding mentioned above takes a long time to carry out because the allocation means 504 must calculate data distribution for the whole of an input image signal. The amount of parameters is also huge which is set on coding required to carry out this data distribution. To realize this method, an associated apparatus becomes large in scale and hence in cost. To improve the picture quality, the processing mentioned above must be repeated a plurality of times in a loop, which in turn increases the processing time.

SUMMARY OF THE INVENTION

In view of above, it is a main object of the present invention to provide an image signal coding method and apparatus used in the same for realizing reduction of the processing time and the apparatus size while keeping coding in a high picture quality.

The other objects, features, and advantages of the present invention will be apparent from the following description.

As its premise, an image signal coding method of the present invention codes an input image signal under predetermined initial conditions and then analyzes the coded result to thereby determine optimal coding conditions for this input image signal for re-coding.

As its premised requirement, the image signal coding method of the present invention includes the steps of setting coding conditions for coding an input image signal; coding the input image signal; extracting a characteristic from the input image signal based on the coded result; and determining optimal coding conditions for the input image signal based on the characteristic extracted from the input image signal.

The image signal coding method of the present invention further includes, as its feature requirement, the steps of subdividing the input image signal into a plurality of video edit units (VEUs) each being one scene of roughly the same coding difficulty based on the characteristic extracted from the input image signal to thereby calculate an average target coding rate for each of these video edit units; and converting the video edit units and the average target coding rates into coding conditions for updating thereof.

By the image signal coding method of the present invention, in the step of calculating data distribution corresponding to a characteristic of an input image signal by analyzing a coded result, the data distribution is not determined for all of the pictures. Instead, an aggregate of pictures having roughly the same coding difficulty is captured as one scene. Each of those scenes is prescribed as a video edit unit, so that each input image signal is subdivided into a plurality of video edit units to thereby set an average target coding rate for each of these units and then convert these video edit units and the average target coding rates into coding conditions, based on which are then updated the coding conditions for re-coding. In this case, data distribution to each of the pictures in each video edit unit is determined at the time of re-coding.

A conventional technology takes a long time in processing because data distribution is calculated for the whole of an input image signal. To realize such data distribution for the whole of an input image signal, a huge amount of parameters must be set on coding. These disadvantages increase the size and the cost of a relevant apparatus.

The present invention, on the other hand, does not distribute data to the whole of an input image signal evenly. By the invention, each input image signal is subdivided into a plurality of video edit units each being a scene having roughly the same coding difficulty to thereby determine an average target coding rate for each of these video edit units and use it as coding conditions. In each video edit unit, all the pictures have roughly the same coding difficulty. Accordingly, a relevant apparatus can be reduced in scale and processing time required. Also, just ordinary coding control is enough for sufficient data distribution. Therefore, the present invention provides a picture quality comparable to that by the background art.

Thus, it is realized that the processing time and the apparatus scale can be reduced. At the same time, it is possible to provide almost the same high picture quality coding as that by the background art.

As its premised requirement, the image signal coding apparatus of the present invention includes coding means for coding an input image signal; parameter setting means for setting coding conditions necessary for the coding means to execute coding processing; encode information creating means for extracting characteristics information from the input image signal based on a result of coding by the coding means; and allocation means for determining data distribution based on the characteristics information extracted from the input image signal by the encode information creating means.

The image signal coding apparatus of the present invention provides, as its feature requirement, the allocation means with a function of subdividing the input image signal into a plurality of video edit units (VEUs) each being a scene having roughly the same coding difficulty to calculate an average target coding rate for each of these video edit units. Further, the apparatus includes an updated coding conditions creating means for converting both video edit units and average target coding rates obtained as a result of calculation by the allocation means into coding conditions and then sending them to the parameter setting means.

The input image signal is coded according to a predetermined initial parameter set by the parameter setting means. The coded result and the conditions on coding are sent to the encode information creating means to be analyzed there. An analysis result obtained by the encode information creating means is sent to the allocation means.

The allocation means, based on the analysis result, captures as one scene an aggregate of such pictures that have roughly the same coding difficulty and prescribes it as a video edit unit, so that the input image signal is subdivided into a plurality of video edit units to calculate an average target coding rate for each of these video edit units.

The position information of the video edit units and the average target coding rate calculated by the allocation means are converted into coding conditions for re-coding by the updated coding conditions creating means.

Corresponding to a result output from the updated coding conditions creating means, the parameter setting means changes the coding conditions, so that under thus changed new coding conditions, the coding means re-code the input image signal.

Data distribution inside of each video edit unit can be determined by control of the coding means.

In case that once re-coding alone is not enough to obtain a satisfactory coded picture quality, the re-coding step can be repeated in a loop any number of times to further improve the picture quality.

Inside of each video edit unit, all the pictures have roughly the same coding difficulty. Accordingly, sufficient data distribution can be conducted even with ordinary coding control, which requires only a small apparatus size and a short processing time.

This in turn enables obtaining a picture quality comparable to that by a conventional system. The operations mentioned above enable coding corresponding to a characteristic of an input image signal, thus improving the coded picture quality.

That is, the image signal coding apparatus of the present invention can realize high picture quality coding comparable to that by the background art while realizing reduction of the processing time and the apparatus scale.

A preferred aspect of the image signal coding apparatus of the present invention further includes coded-data storage means for extracting and storing coded information usable on re-coding based on the coded result by the coding means. The coding means has such a configuration as to re-code by utilizing the coded information stored in the coded-data storage means, in re-coding.

In this aspect, the encode information creating means, the allocation means, and the updated coding conditions creating means assist optimal coding processing when the coding means re-codes the input image signal. In this case, the re-coding by the coding means cause a load on the circuit operations. To guard against this, the inventor has discussed how to re-utilize original coded information in re-coding. This resulted in the invention. In re-coding, such coded information can be re-utilized as a motion vector, a scene change position, and an activity. Omission of re-calculation of a motion vector, in particular, brings about a significant reduction of the processing time on the processing of re-coding the input image signal.

Another preferred aspect of the present invention further includes a buffer control switching means provided to the coding means. This buffer control switching means inhibits forced control for the purpose of avoiding overflow/underflow for a virtual buffer at the coding means if initial coding is conducted on the input image signal and, otherwise, permits it.

In this aspect, the data obtained by coding an input image signal fluctuates in amount for each picture, so that a difference in the amount is to be accommodated in reproduction by an input buffer provided to a reproduction apparatus. To avoid overflow/underflow of the input buffer on reproduction, typically, the coding means is internally provided with a virtual buffer. In configuration, forced control is conducted to avoid possible overflow/underflow of this virtual buffer. If this forced control is conducted in coding, however, a coded result cannot reflect a characteristic of the input image signal. To solve this problem, in the first coding processing, the buffer control switching means controls the coding means so as to deactivate forced control by the virtual buffer. This control enables properly capturing, at least regarding the first coding processing, such a characteristic of the input image signal that is brought about by the coding processing, thus securing the subsequent correct operations of the encode information creating means and the allocation means.

A further preferred aspect of the present invention further includes a coded data storage means and a buffer control switching means.

The coded data storage means stores such coded information that can be utilized by the coding means when it re-codes an input image signal based on the coded result. In configuration, the coding means, in such a case, conducts re-coding processing by utilizing coded information stored in the coded data storage means.

The buffer control switching means inhibits forced control for the purpose of avoiding overflow/underflow of the virtual buffer against the coding means if the coding means conducts the first coding processing on the input image signal and, otherwise, permits the forced control.

This aspect corresponds to something that integrates the preceding two aspects, thus enabling obtaining the actions of both of them.

BRIEF DESCRIPTION OF THE DRAWINGS

These and other objects as well as advantages of the invention will become clear by the following description of preferred embodiments of the invention with reference to the accompanying drawings, wherein.

DETAILED DESCRIPTION OF THE PREFERRED EMBODIMENTS

First Embodiment

Figure 1:
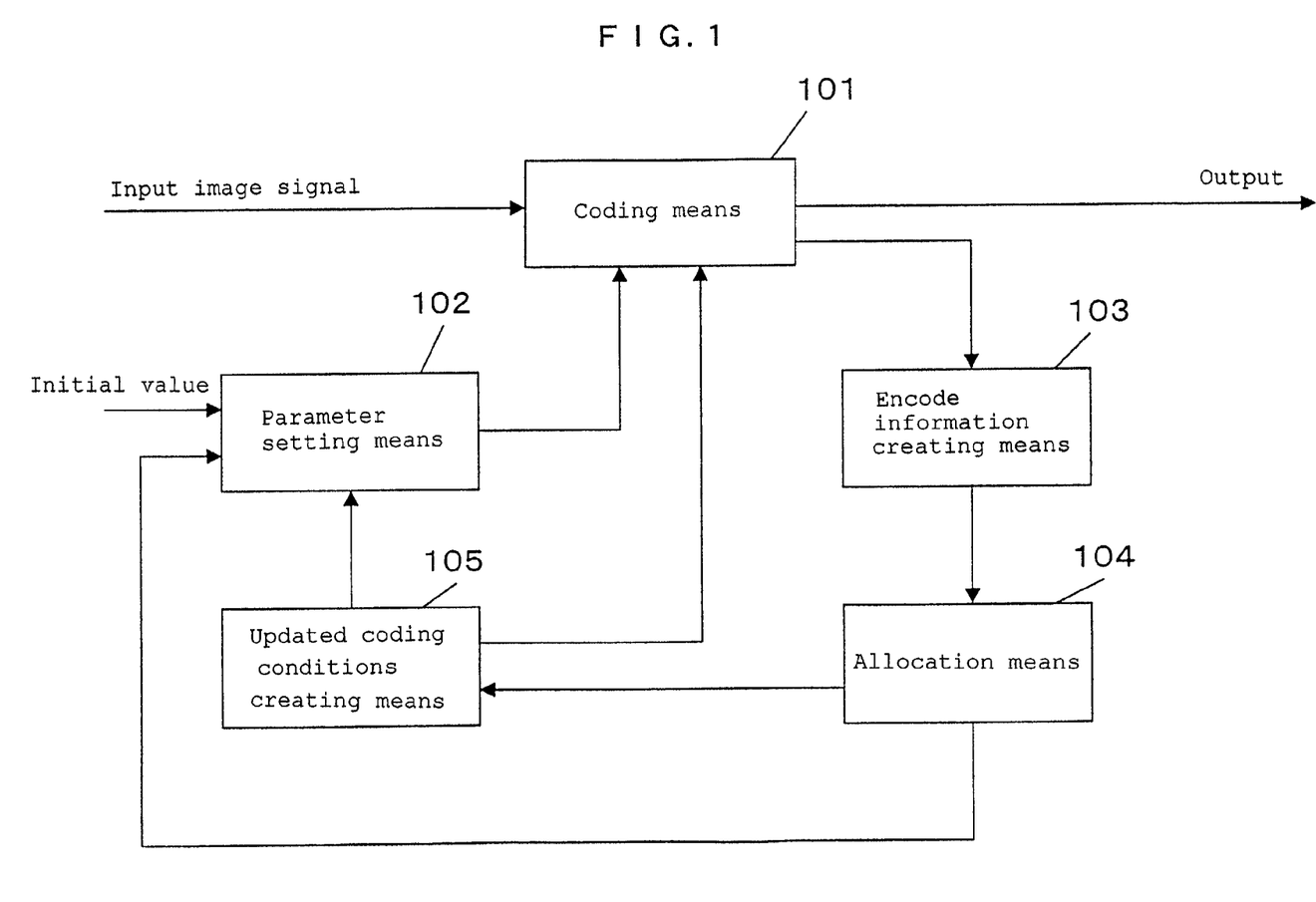
FIG. 1 is a block diagram for showing an image signal coding apparatus according to a first preferred embodiment of the invention.

The following will describe an image signal processing apparatus according to a first preferred embodiment of the present invention with reference to FIG. 1; coding means 101 codes an input image signal. Parameter setting means 102 sets coding conditions. Encode information creating means 103 extracts a characteristic from the input image signal based on a coded result by the coding means 101. Allocation means 104 subdivides the input image signal into a plurality of video edit units (VEUs) based on the characteristic information extracted from the input image signal to thereby calculate an average target coding rate for each of these video edit units (VEUs). An updated coding conditions creating means 105 is configured to convert the position information and the average coding rate of the video edit units (VEUs) calculated by the allocation means 104 into coding conditions and then sends them to the parameter setting means 102.

The operations are as follows.

An input signal is coded by the coding means 101 according to a predetermined initial parameter set by the parameter setting means 102. The coded result and the coding conditions are sent to the encode information creating means 103 to be analyzed there. The encode information creating means 103 determines a coding difficulty of each of pictures constituting the input image signal by referencing, for example, an amount of codes generated in coding, a quantization step used in coding, a magnitude of a motion vector, an activity, and execution/non-execution of scene change. An analysis result obtained by the encode information creating means 103 is sent to the allocation means 104.

The allocation means 104 in turn captures as one scene an aggregate of the pictures having roughly the same coding difficulty based on the coding difficulty of each of the pictures created by the encode information creating means 103 and prescribes it as a video edit unit (VEU), so as to subdivide the input image signal into a plurality of video edit units (VEUs), thus calculating an average target coding rate for each of the video edit units (VEUs).

The updated coding conditions creating means 105 converts the position information and the average target coding rate of the video edit units (VEUs) calculated by the allocation means 104 into coding conditions. The position information of the video edit units (VEUs) may be given as, for example, time codes for a start frame and an end frame of the video edit units (VEUs) or a time code for the start frame of the video edit units (VEUs) and the number of frames contained in the video edit units (VEUs).

The parameter setting means 102 changes the coding conditions corresponding to the results output by the allocation means 104 and the updated coding conditions creating means 105, so that based on the changed coding conditions, the coding means 101 re-codes the input image signal. Data distribution in the video edit units (VEUs) is determined by control of the coding means 101.

If once re-coding alone is not enough to obtain a satisfactory coded picture quality, these steps can be repeated in a loop any number of times to thereby improve the picture quality. In this case, rather than repeating all of the steps, only such a step of calculation by the allocation means 104 may be repeated in a loop to optimize the data distribution.

Since the pictures in each of the video edit units (VEUs) have roughly the same coding difficulty, satisfactory data distribution can be executed even by ordinary coding control requiring only a small apparatus scale and a short processing time, thus obtaining a picture quality comparable to that by the conventional system. Such operations enable coding corresponding to the characteristic of the input image signal, thus improving the coded picture quality.

Second Embodiment

Figure 2:
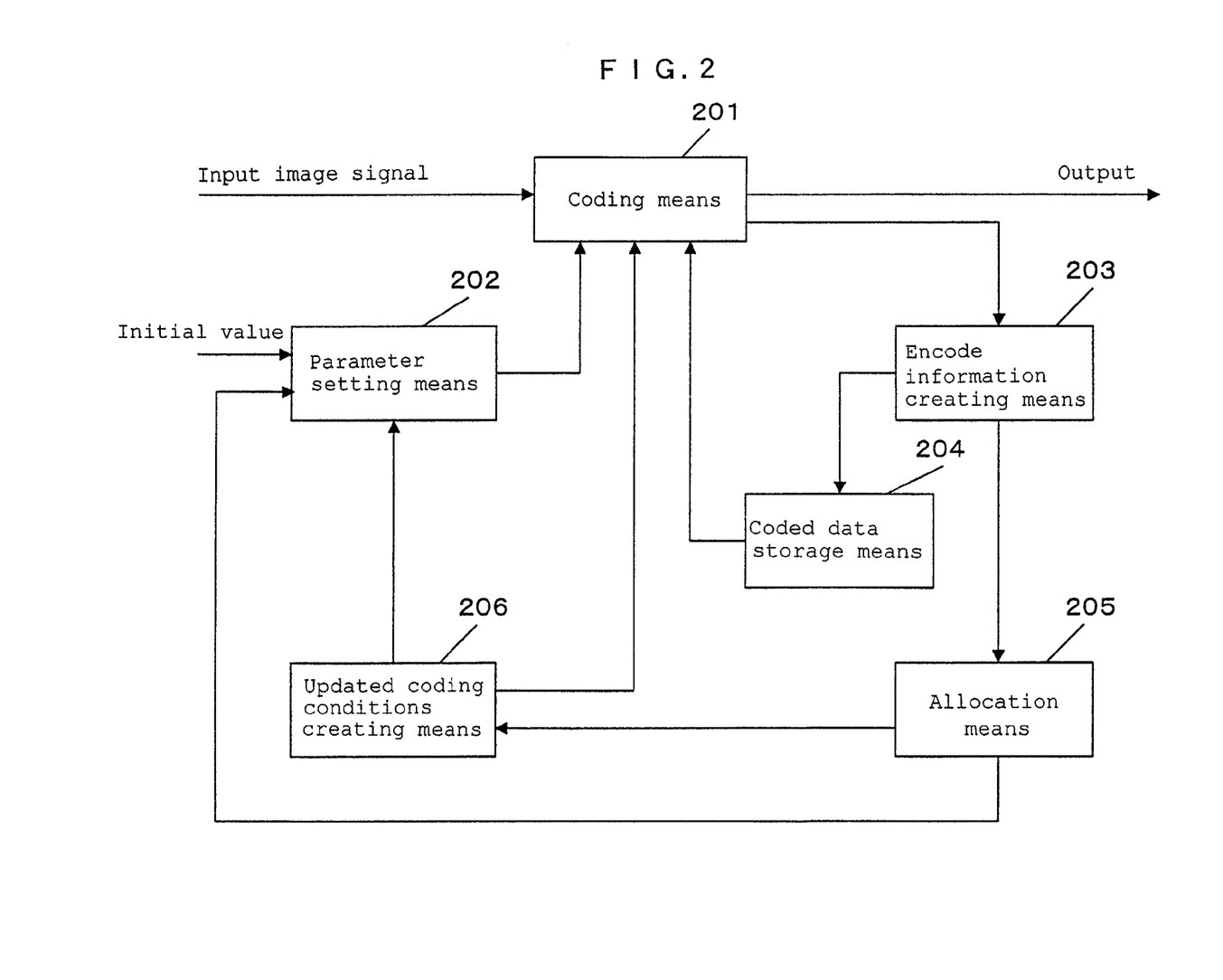
FIG. 2 is a block diagram for showing the image signal coding apparatus according to a second preferred embodiment of the invention.

The following will describe the image signal coding apparatus according to a second embodiment of the present invention with reference to FIG. 2; coding means 201 codes an input image signal. Parameter setting means 202 sets coding conditions. Encode information creating means 203 extracts a characteristic from the input image signal based on a coded result by the coding means 201. Coded data storage means 204 extracts coded information usable in re-coding based on the coded result and stores it. Allocation means 205 subdivides the input image signal into a plurality of video edit units (VEUs) based on character information extracted from the image signal, to calculate an average target coding rate for each of these video edit units (VEUs). An updated coding conditions creating means 206 is configured to convert the position information of the video edit units (VEUs) and the average target coding rate calculated by the allocation means 205 into coding conditions and sends them to the parameter setting means 202. The coding means 201 is configured to utilize the coded information stored in the coded data storage means 204 in its re-coding processing.

The operations are as follows.

The input image signal is coded by the coding means 201 according to a predetermined initial parameter set by the parameter setting means 202. The coded result and the coding conditions are sent to the encode information creating means 203 to be analyzed there. The encode information creating means 203 determines a coding difficulty of each of pictures constituting the input image signal by referencing, for example, an amount of codes generated in coding, a quantization step used in coding, a magnitude of a motion vector, an activity, execution/non-execution of scene change.

Of the coded information used in this step, such coded information items that can be utilized in re-coding are stored in the coded data storage means 204. The coded information items that can be utilized in re-coding include a motion vector, a scene-changed position information, an activity, etc.

An analysis result by the encode information creating means 203 is sent to the allocation means 205. The allocation means 205, in turn, captures as one scene an aggregate of the pictures having roughly the same coding difficulty based on the coding difficulty of each of the pictures created by the encode information creating means 203 and prescribes it as a video edit unit (VEU), so that the input image signal is subdivided into a plurality of video edit units (VEUs) to calculate an average target coding rate for each of these video edit units (VEUs).

The updated coding conditions creating means 206 converts the position information of the video edit units (VEUs) and the average target coding rate calculated by the allocation means 205 into coding conditions. The position information of the video edit units (VEUs) may be given as, for example, time codes of a start frame and an end frame of the video edit unit (VEU) or a time code of the start frame of the video edit unit (VEU) and the number of frames contained in the video edit unit (VEU).

The parameter setting means 202 changes the coding conditions according to the results output by the allocation means 205 and the updated coding conditions creating means 206, so that based on thus changed new coding conditions, the coding means 201 re-codes the input image signal. Data distribution in the video edit unit (VEU) is determined by control of the coding means 201.

In this step, the coding means 201 can re-code the signal by utilizing the coded information stored in the coded data storage means 204 to thereby omit a step of motion vector calculations etc., thus reducing the processing time for re-coding.

If once re-coding alone is not enough to obtain a satisfactory coded picture quality, the re-coding step can be repeated in a loop to thereby further improve the picture quality. In this case, rather than repeating all the steps in a loop, only a calculation step of the allocation means 205 can be repeated in a loop any number of times for optimization of data distribution.

In each of the video edit units (VEUs), the pictures have roughly the same coding difficulty to thereby enable satisfactory data distribution even with ordinary coding control requiring only a small apparatus scale and a short processing time, thus obtaining a picture quality comparable to that by the conventional system. Such operations enable coding corresponding to the characteristic of the input image signal, thus improving the coded picture quality. In particular, in re-coding, the coding means can effectively utilize a motion vector, a scene changed position, and an activity stored in the coded data storage means to thereby eliminate the necessity of re-calculating the motion vector etc., thus significantly reducing the processing time for re-coding.

Third Embodiment

Figure 3:
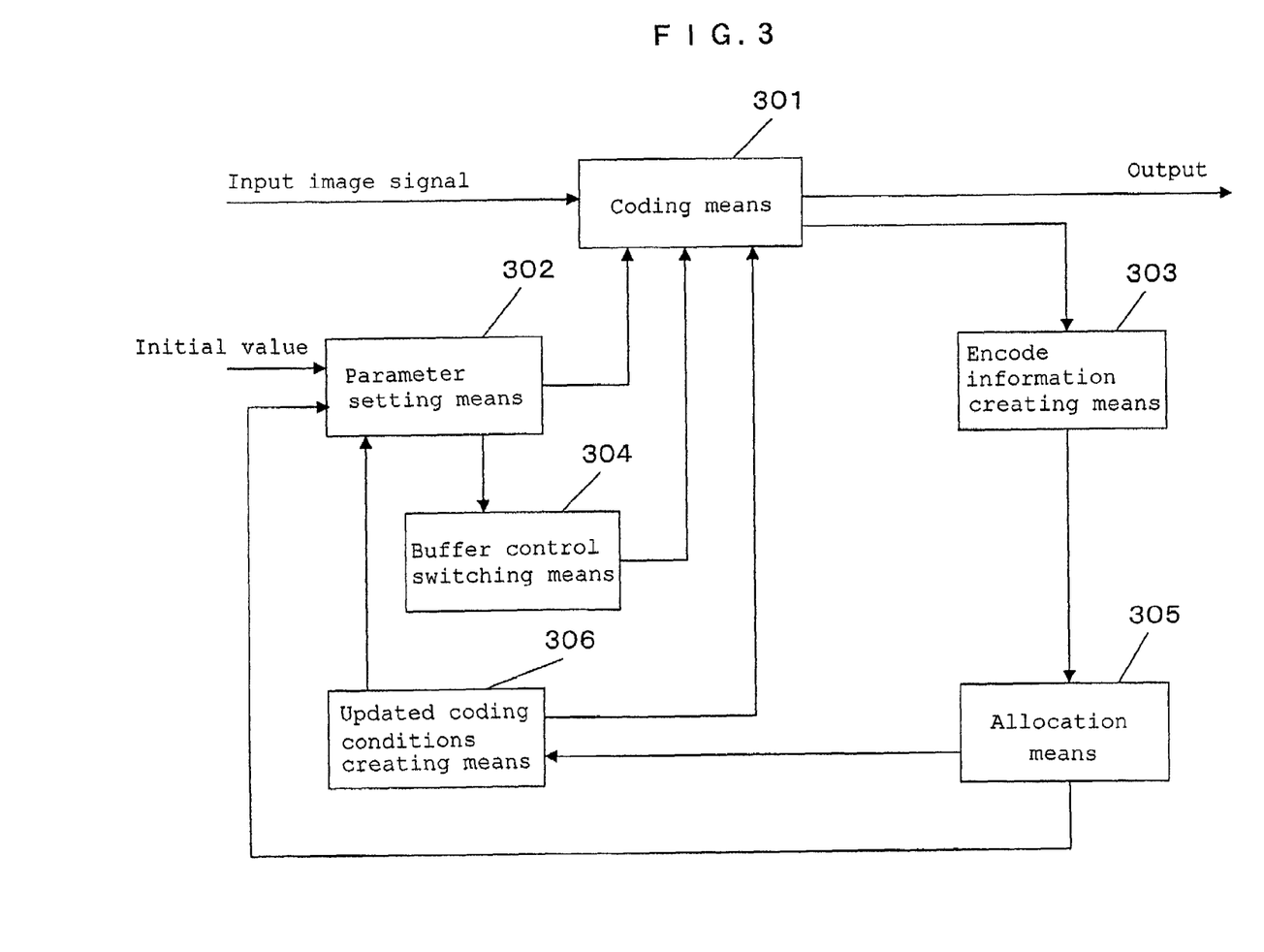
FIG. 3 is a block diagram for showing the image signal coding apparatus according to a third preferred embodiment of the invention.

The following will describe the image signal coding apparatus according to a third embodiment of the present invention with reference to FIG. 3; coding means 301 codes an input image signal. Parameter setting means 302 sets coding conditions. Encode information creating means 303 extracts a characteristic from the input image signal based on a coded result by the coding means 301. Buffer control switching means 304 switches between execution and non-execution of forced control in coding processing by the coding means 301. Allocation means 305 subdivides the input image signal into a plurality of video edit units (VEUs) based on the characteristic information extracted from the input image signal to thereby calculate an average target coding rate for each of these video edit units (VEUs). An updated coding conditions creating means 306 is configured to convert the position information of the video edit units (VEUs) and the average target coding rate calculated by the allocation means 305 into coding conditions and send them to the parameter setting means 302. The buffer control switching means 304 is configured to inhibit forced control for the purpose of avoiding overflow/underflow for a virtual buffer at the coding means 301 if initial coding is conducted on the input image signal and, otherwise, permit it.

The operations are as follows.

The input image signal is coded by the coding means 301 according to a predetermined initial parameter set by the parameter setting means 302.

The data obtained by coding the input image signal does not provide a constant data amount for each of the pictures, so that an input buffer is provided to a reproducing apparatus to accommodate a difference in the data amount in reproduction. To avoid overflow or underflow of the input buffer in reproduction, the coding means 301 is provided internally with the virtual buffer and has, in configuration, forced control conducted thereon in case of overflow or underflow of this virtual buffer.

If this forced control is conducted in coding, however, a coded result does not correctly reflect the character of the input image signal, so that the buffer control switching means 304 controls the operations of the coding means 301 so as to disable forced control by means of the virtual buffer in the first (first-time) coding.

The coded result and the coding conditions are sent to the encode information creating means 303 to be analyzed there. The encode information creating means 303 determines a coding difficulty of each of the pictures constituting the input image signal by referencing, for example, an amount of codes generated in coding, a quantization step used in coding, a magnitude of a motion vector, an activity, execution/non-execution of scene change, etc.

The allocation means 305 captures as one scene an aggregate of the pictures having roughly the same coding difficulty based on the coding difficulty of each of the pictures created by the encode information creating means 303 and prescribes it as a video edit unit (VEU), so that the input image signal is subdivided into a plurality of video edit units (VEUs) to calculate an average target coding rate of for each of the video edit units (VEUs).

The updated coding conditions creating means 306 converts the position information of the video edit units (VEUs) and the average target coding rate calculated by the allocation means 305 into coding conditions. The position information of the video edit units (VEUs) may be given as, for example, time codes of a start frame and an end frame of the video edit unit (VEU) or a time code of the start frame of the video edit unit (VEU) and the number of frames contained therein.

The parameter setting means 302 changes the coding conditions corresponding to the results output by the allocation means 305 and the updated coding conditions creating means 306, so that based on thus changed new coding conditions, the coding means 301 re-codes the input image signal. Data distribution in the video edit unit (VEU) is determined by control of the coding means 301. In the initial coding executed by the coding means 301, the buffer control switching means 304 provides control so as to disable forced control over the virtual buffer at the coding means 301. That is, it inhibits forced control for the purpose of avoiding overflow/underflow. In re-coding, the forced control is permitted.

If once re-coding is not enough to obtain a satisfactory coded picture quality, the step can be repeated in a loop any number of times to further improve the picture quality. In this case, rather than repeating all the steps, only the calculation step of the allocation means 305 may be repeated in a loop to thereby optimize data distribution.

In each of the video edit units (VEUs), the pictures have roughly the same coding difficulty to thereby enable satisfactory data distribution even with ordinary coding control requiring only a small apparatus scale and a short processing time, thus obtaining a picture quality comparable to that by the conventional system. Such operations enable coding corresponding to the characteristic of the input image signal, thus improving the coded picture quality. In particular, by inhibiting forced control for the purpose of avoiding overflow/underflow on the virtual buffer at least in the initial coding by the coding means, it is possible to, in the initial coding, correctly capture the characteristic of the input image signal, thus securing the subsequent operations of the encode information creating means and the allocation means.

Fourth Embodiment

Figure 4:
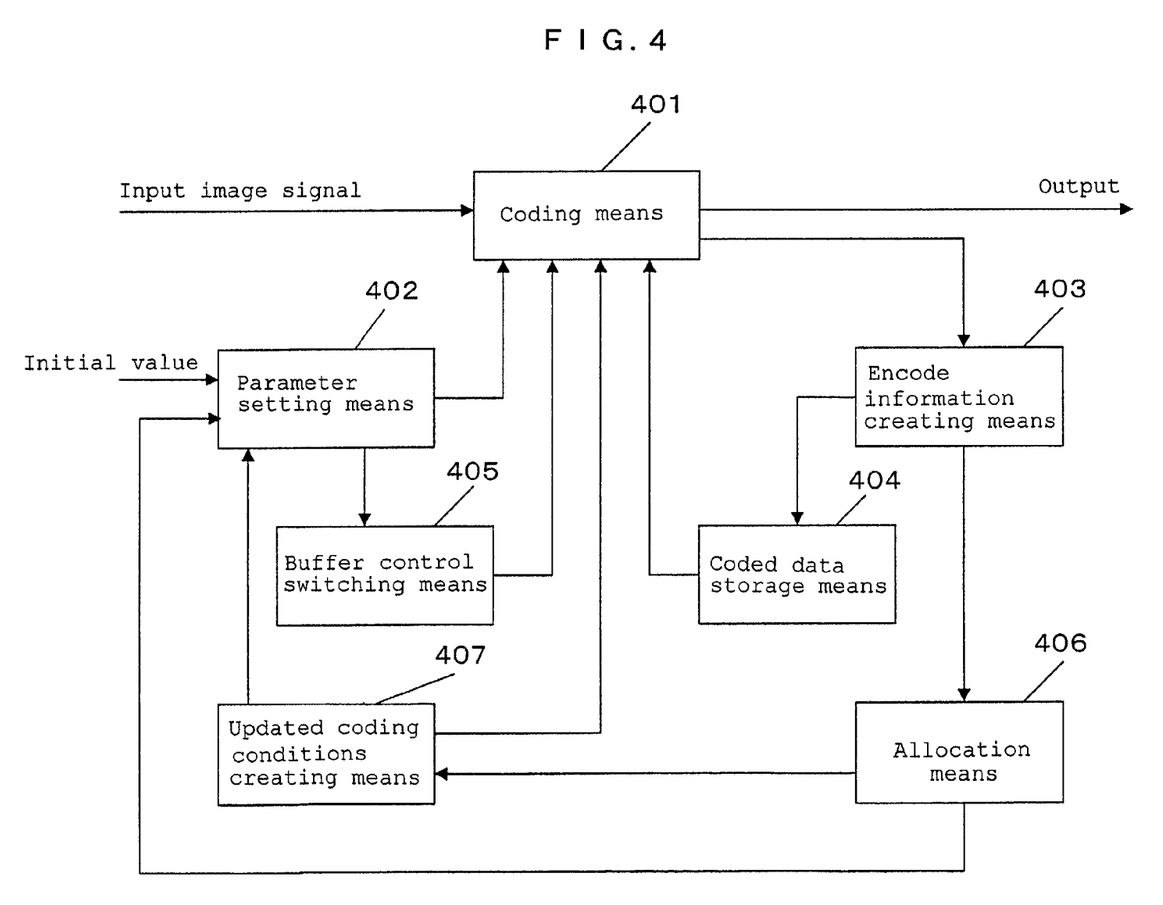
FIG. 4 is a block diagram for showing the image signal coding apparatus according to a fourth preferred embodiment of the invention.

The following will describe the image signal coding apparatus according to a fourth embodiment of the present invention with reference to FIG. 4; coding means 401 codes an input image signal. Parameter setting means 402 sets coding conditions. Encode information creating means 403 extracts a characteristic from the input image signal based on a coded result by the coding means 401. Coded data storage means 404 extracts such coded information from the coded result that can be usable in re-coding and stores it. Buffer control switching means 405 switches between execution and non-execution of forced control in coding by the coding means 401. Allocation means 406 subdivides the input image signal into a plurality of video edit units (VEUs) based on the characteristic information extracted from the input image signal to thereby calculate an average target coding rate for each of these video edit units (VEUs). An updated coding conditions creating means 407 is configured to convert the position information of the video edit units (VEUs) and the average target coding rate calculated by the allocation means 406 into coding conditions and send them to the parameter setting means 402. The coding means 401 is configured to conduct re-coding by utilizing the coded information stored in the coded data storage means 404. The buffer control switching means 405 is configured to inhibit forced control for the purpose of avoiding overflow/underflow for a virtual buffer at the coding means 401 if initial coding by the coding means 401 is conducted on the input image signal and, otherwise, permit it.

The operations are as follows.

The input image signal is coded by the coding means 401 according to a predetermined initial parameter set by the parameter setting means 402.

The data obtained by coding the input image signal does not provide a constant data amount for each of the pictures, so that an input buffer is provided to a reproducing apparatus to accommodate a difference in the data amount in reproduction. To avoid overflow or underflow of the input buffer in reproduction, the coding means 401 is provided internally with the virtual buffer and has, in configuration, forced control conducted thereon in case of overflow or underflow of this virtual buffer.

If this forced control is conducted in coding, however, a coded result does not correctly reflect the character of the input image signal, so that the buffer control switching means 405 controls the operations of the coding means 401 so as to disable forced control by means of the virtual buffer in the first (first-time) coding.

The coded result and the coding conditions are sent to the encode information creating means 403 to be analyzed there. The encode information creating means 403 determines a coding difficulty of each of the pictures constituting the input image signal by referencing, for example, an amount of codes generated in coding, a quantization step used in coding, a magnitude of a motion vector, an activity, execution/non-execution of scene change, etc.

Of the coded information used in this step, such coded information items that can be utilized in re-coding are stored in the coded data storage means 404. Such coded information items usable in re-coding may include a motion vector, a scene changed position information, an activity, etc.

The analysis result obtained by the encode information creating means 403 is sent to the allocation means 406. The allocation means 406 captures as one scene an aggregate of the pictures having roughly the same coding difficulty based on the coding difficulty of each of the pictures created by the encode information creating means 403 and prescribes it as a video edit unit (VEU), so that the input image signal is subdivided into a plurality of video edit units (VEUs) to calculate an average target coding rate of for each of the video edit units (VEUs).

The updated coding conditions creating means 407 converts the position information of the video edit units (VEUs) and the average target coding rate calculated by the allocation means 406 into coding conditions. The position information of the video edit units (VEUs) may be given as, for example, time codes of a start frame and an end frame of the video edit unit (VEU) or a time code of the start frame of the video edit unit (VEU) and the number of frames contained therein.

The parameter setting means 402 changes the coding conditions corresponding to the results output by the allocation means 406 and the updated coding conditions creating means 407, so that based on thus changed new coding conditions, the coding means 401 re-codes the input image signal. In this step, the buffer control switching means 405 controls the operations of the coding means 401 so as to activate forced control by means of the virtual buffer. Data distribution in the video edit unit (VEU) is determined by control of the coding means 401.

In this step, the coding means 401 can re-code the signal by utilizing the coded information stored in the coded data storage means 404 to thereby omit a step of motion vector calculations etc., thus reducing the processing time for re-coding.

If once re-coding is not enough to obtain a satisfactory coded picture quality, the step can be repeated in a loop any number of times to further improve the picture quality. In this case, rather than repeating all the steps, only the calculation step of the allocation means 406 may be repeated in a loop to thereby optimize data distribution.

In each of the video edit units (VEUs), the pictures have roughly the same coding difficulty to thereby enable satisfactory data distribution even with ordinary coding control requiring only a small apparatus scale and a short processing time, thus obtaining a picture quality comparable to that by the conventional system. Such operations enable coding corresponding to the characteristic of the input image signal, thus improving the coded picture quality. In particular, in its re-coding processing, the coding means can effectively utilize a motion vector, a scene changed position, and an activity stored in the coded data storage means to thereby eliminate the necessity of re-calculating the motion vector etc., thus significantly reducing the processing time for re-coding. In addition, by inhibiting forced control for the purpose of avoiding overflow/underflow on the virtual buffer at least in the initial coding by the coding means, it is possible to, in the initial coding, correctly capture the characteristic of the input image signal, thus securing the subsequent operations of the encode information creating means and the allocation means.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. An image signal coding method for coding an input image signal under predetermined initial conditions and analyzing an obtained coded result to thereby determine optimal coding conditions for said input image signal and then re-code said input image signal, comprising the steps of:

setting coding conditions for coding said input image signal;

coding said input image signal;

extracting a characteristic from said input image signal based on said coded result;

subdividing said input image signal into a plurality of video edit units (VEUs) each being a scene comprising an aggregate of pictures having roughly the same coding difficulty based on said characteristic extracted from said input image signal, to calculate an average target coding rate for each of said video edit units; and converting said video edit units and said average target coding rate into coding conditions to thereby update said coding conditions for re-coding said input image signal.

2. An image signal coding apparatus comprising:

coding means for coding an input image signal;

parameter setting means for setting coding conditions necessary for said coding means to perform coding processing;

encode information creating means for extracting characteristic information from said input image signal based on a coded result by said coding means;

allocation means for subdividing said input image signal into a plurality of video edit units (VEUs) each being a scene comprising an aggregate of pictures having roughly the same coding difficulty based on said characteristic information extracted from said input image signal by said encode information creating means, to calculate an average target coding rate for each of said video edit units, said allocation means outputting the average target coding rate; and an updated coding conditions creating means for receiving said average target coding rate from said allocation means and for converting said video edit units and said average target coding rate calculated by said allocation means into coding conditions, said updated coding conditions creating means sends said coding conditions to said parameter setting means.

3. The image signal coding apparatus according to claim 2, further comprising coded data storage means for extracting such coded information that can be utilized in re-coding, based on said coded result by said coding means, wherein said coding means is configured to utilize, in re-coding, said coded information stored in said coded data storage means.

4. The image signal coding apparatus according to claim 2, further comprising buffer control switching means for inhibiting forced control for the purpose of avoiding overflow/underflow on a virtual buffer at said coding means if said coding means performs initial coding processing on said input image signal and, otherwise, permitting said forced control.

5. The image signal coding apparatus according to claim 2, further comprising:

coded data storage means for extracting such coded information that can be utilized in re-coding, based on said coded result by said coding means, said coding means being configured to utilize, in re-coding, said coded information stored in said coded data storage means; and buffer control switching means for inhibiting forced control for the purpose of avoiding overflow/underflow on a virtual buffer at said coding means if said coding means performs initial coding processing on said input image signal and, otherwise, permitting said forced control.

* * * * *